US011466577B2

(12) United States Patent
Sobanski et al.

(10) Patent No.: US 11,466,577 B2
(45) Date of Patent: Oct. 11, 2022

(54) CMC VANE MATE FACE FLANGE

(71) Applicant: United Technologies Corporation, Farmington, CT (US)

(72) Inventors: Jon E. Sobanski, Glastonbury, CT (US); Howard J. Liles, Newington, CT (US); Bryan H. Farrar, West Hartford, CT (US); Cheng Gao, Chula Vista, CA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/592,884

(22) Filed: Oct. 4, 2019

(65) Prior Publication Data
US 2021/0102469 A1 Apr. 8, 2021

(51) Int. Cl.
F01D 9/04 (2006.01)
F01D 5/28 (2006.01)
(52) U.S. Cl.
CPC ............... F01D 5/284 (2013.01); F01D 9/04 (2013.01); *F05D 2300/6033* (2013.01)
(58) Field of Classification Search
CPC . F01D 9/04; F01D 9/041; F01D 9/042; F01D 5/284
See application file for complete search history.

(56) References Cited

U.S. PATENT DOCUMENTS

| 7,004,721 | B2 * | 2/2006 | Imbourg | F01D 5/187 |
| | | | | 415/115 |
| 7,862,291 | B2 * | 1/2011 | Surace | F01D 9/041 |
| | | | | 415/115 |
| 8,834,109 | B2 * | 9/2014 | Propheter-Hinckley | |
| | | | | F01D 9/042 |
| | | | | 415/191 |
| 9,103,214 | B2 * | 8/2015 | McCaffrey | F01D 5/147 |
| 10,072,516 | B2 | 9/2018 | Carr et al. | |

FOREIGN PATENT DOCUMENTS

| EP | 1956192 | 8/2008 |
| EP | 2554795 | 2/2013 |
| EP | 3323612 | 5/2015 |
| EP | 3000979 | 3/2016 |
| EP | 3323993 | 5/2018 |
| WO | 2015023324 | 2/2015 |

OTHER PUBLICATIONS

European Search Report for European Patent Application No. 20199669.1 completed Jan. 29, 2021.

* cited by examiner

*Primary Examiner* — Michael L Sehn
(74) *Attorney, Agent, or Firm* — Carlson, Gaskey & Olds, P.C.

(57) ABSTRACT

A vane arc segment includes a continuous airfoil piece that defines first and second platforms and an airfoil section that extends between the first and second platforms. The airfoil section has a pressure side and a suction side. The first platform defines axially-sloped suction and pressure side circumferential mate faces, first and second axial sides, a gaspath side, a non-gaspath side, and a flange that projects from the non-gaspath side. The flange extends along at least a portion the axially-sloped suction side circumferential mate face.

20 Claims, 4 Drawing Sheets

CMC VANE MATE FACE FLANGE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor section can include rotors that carry airfoils to compress the air entering the compressor section. A shaft may be coupled to the rotors to rotate the airfoils.

SUMMARY

A vane arc segment according to an example of the present disclosure includes a continuous airfoil piece that defines first and second platforms and an airfoil section that extends between the first and second platforms. The airfoil section has a pressure side and a suction side. The first platform defines axially-sloped suction and pressure side circumferential mate faces, first and second axial sides, a gaspath side, a non-gaspath side, and a flange that projects from the non-gaspath side. The flange extends along at least a portion the axially-sloped suction side circumferential mate face.

In a further embodiment of any of the foregoing embodiments, the airfoil piece is formed of a ceramic matrix composite.

In a further embodiment of any of the foregoing embodiments, the ceramic matrix composite has a plurality of fiber plies that are continuous through the flange and first platform, the airfoil section, and the second platform.

In a further embodiment of any of the foregoing embodiments, the flange bears radial, tangential, and axial aerodynamic load transmissions of the airfoil piece.

In a further embodiment of any of the foregoing embodiments, the axially-sloped suction and pressure side circumferential mate faces form an angle of at least 45° relative to an axial direction of the vane arc segment.

In a further embodiment of any of the foregoing embodiments, the flange is coextensive with the axially-sloped suction side circumferential mate face.

In a further embodiment of any of the foregoing embodiments, the flange is flush with the axially-sloped suction side circumferential mate face.

In a further embodiment of any of the foregoing embodiments, the flange includes a radial face that has a curved profile.

In a further embodiment of any of the foregoing embodiments, the curved profile is a cylindrical surface segment.

A vane arc segment according to an example of the present disclosure includes a continuous airfoil piece that defines first and second platforms and an airfoil section extending between the first and second platforms. The airfoil section has a pressure side and a suction side. The first platform defines axially-sloped suction and pressure side circumferential mate faces, first and second axial sides, a gaspath side, a non-gaspath side, and a flange that projects from the non-gaspath side. The flange has faces that bear radial, tangential, and axial aerodynamic load transmissions of the airfoil piece.

In a further embodiment of any of the foregoing embodiments, one of the faces of the flange is a radial face, and the radial face has a curved profile.

In a further embodiment of any of the foregoing embodiments, the curved profile is a cylindrical surface segment.

In a further embodiment of any of the foregoing embodiments, the flange is elongated along a flange axis, and the flange axis is substantially perpendicular to a total aerodynamic load vector of the airfoil piece.

In a further embodiment of any of the foregoing embodiments, the airfoil piece is formed of a ceramic matrix composite that has a plurality of fiber plies that are continuous through the flange and first platform, the airfoil section, and the second platform.

In a further embodiment of any of the foregoing embodiments, the axially-sloped suction and pressure side circumferential mate faces form an angle of at least 45° relative to an axial direction of the vane arc segment.

In a further embodiment of any of the foregoing embodiments, the flange is coextensive with the axially-sloped suction side circumferential mate face, and the flange is flush with the axially-sloped suction side circumferential mate face.

A vane arc segment according to an example of the present disclosure includes an airfoil piece that defines first and second platforms and an airfoil section extending between the first and second platforms. The airfoil section has a pressure side and a suction side. The first platform defines suction and pressure side circumferential mate faces, first and second axial sides, a gaspath side, a non-gaspath side, and a flange that projects from the non-gaspath side. The flange has one or more faces that bear aerodynamic load transmissions of the airfoil piece. The airfoil piece is formed of a ceramic matrix composite having a plurality of fiber plies that are continuous through the flange and first platform, the airfoil section, and the second platform.

In a further embodiment of any of the foregoing embodiments, the ceramic matrix composite contains a SiC matrix and SiC fibers.

In a further embodiment of any of the foregoing embodiments, one of the faces of the flange is a radial face, the radial face has a curved profile, and the curved profile is a cylindrical surface segment.

In a further embodiment of any of the foregoing embodiments, the suction and pressure side circumferential mate faces are axially-sloped and form an angle of at least 45° relative to an axial direction of the vane arc segment, the flange is coextensive with the suction side circumferential mate face, and the flange is flush with the axially-sloped suction side circumferential mate face.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
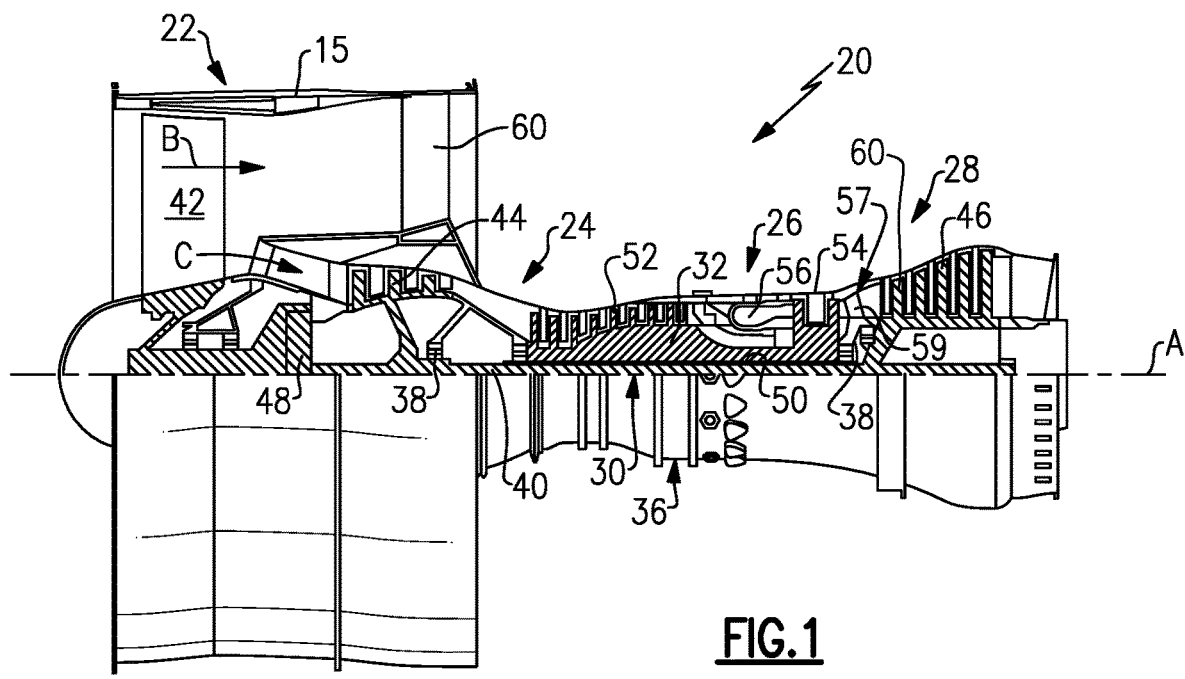
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2A:
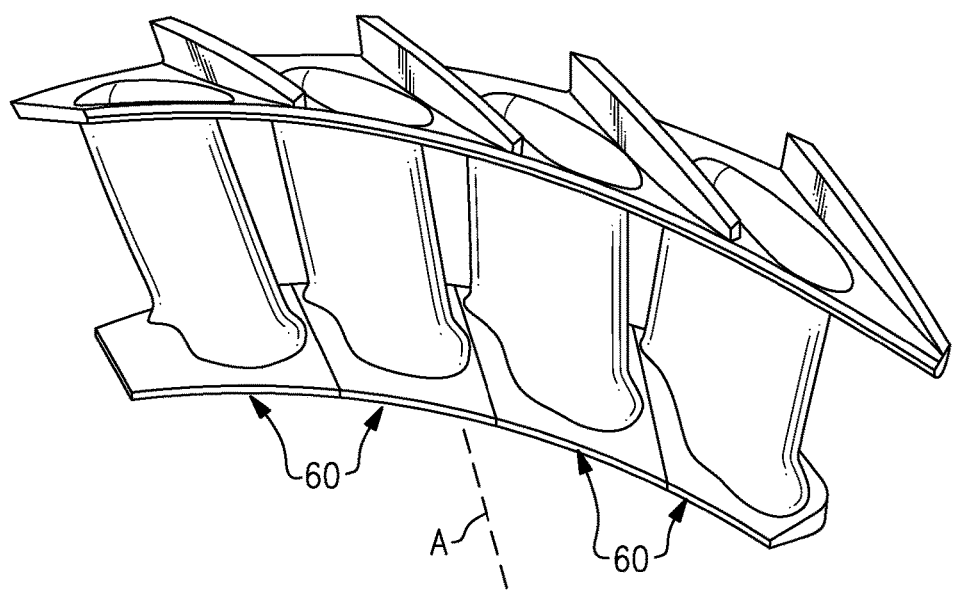
FIG. 2A illustrates a portion of a vane ring assembly.
Figure 3A:
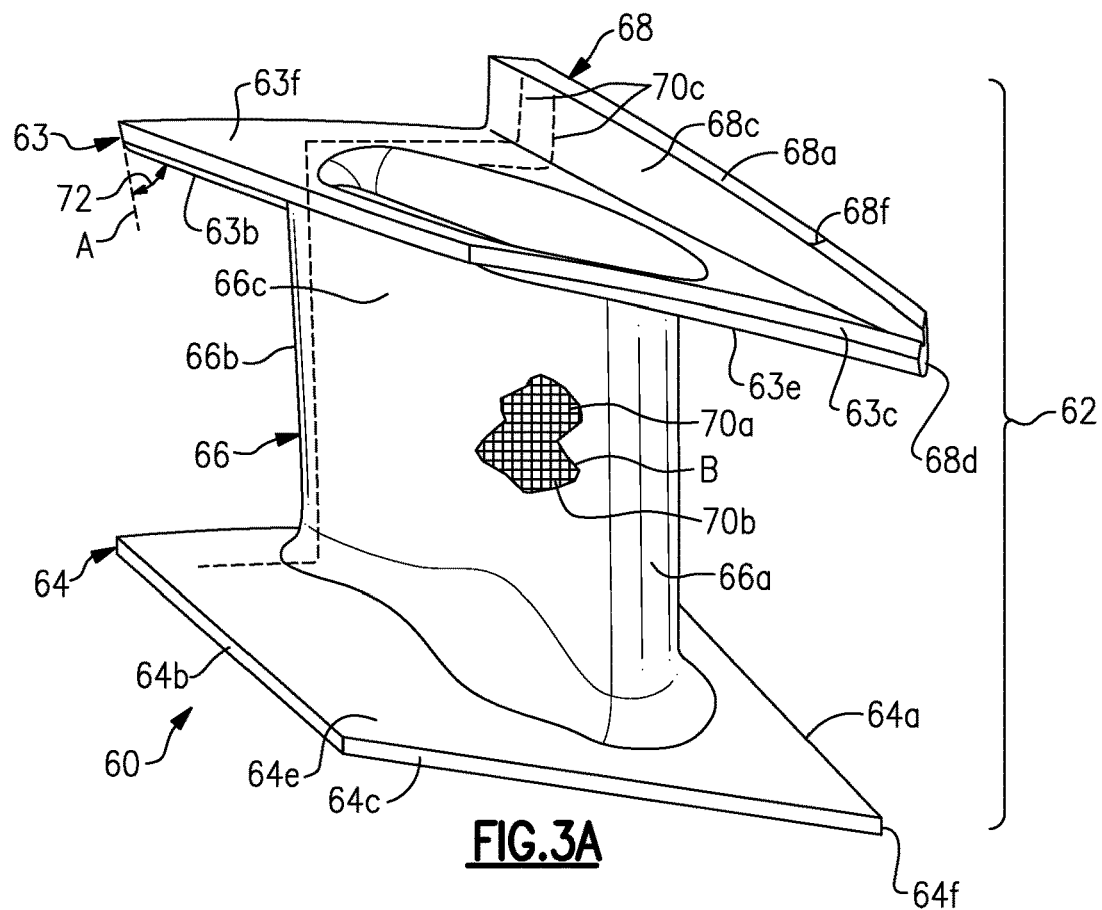
FIG. 3A illustrates an isolated view of a vane arc segment.
Figure 3B:
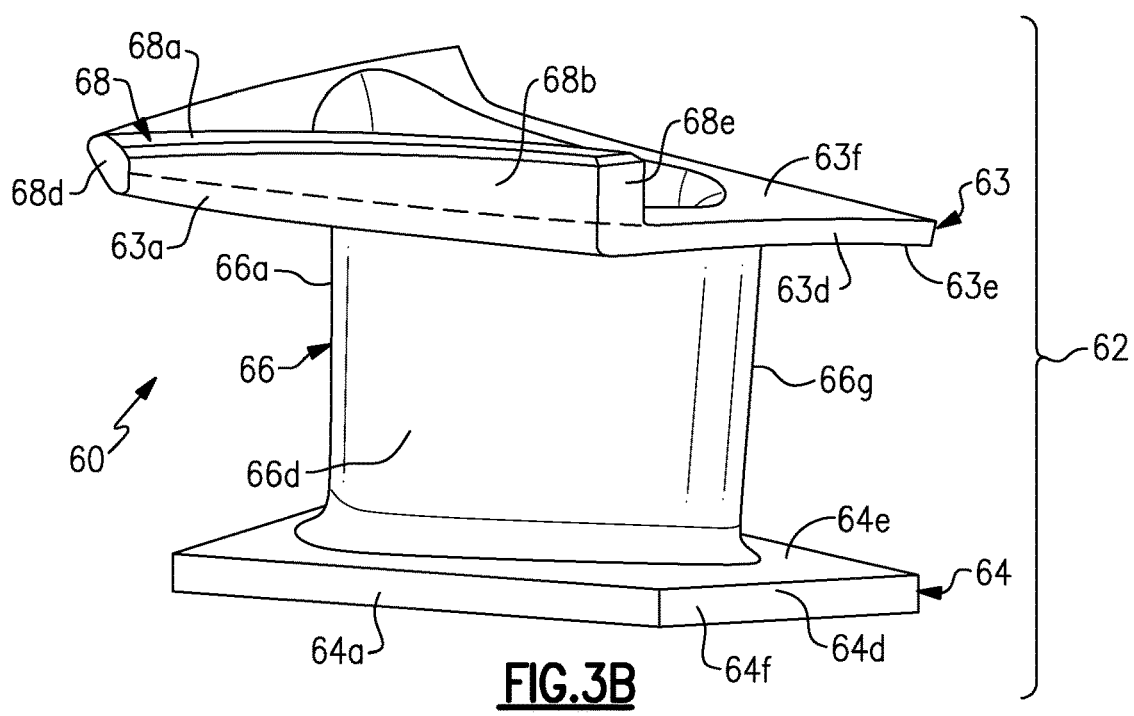
FIG. 3B illustrates the vane arc segment of FIG. 3A but from a different angle.

FIG. 2A illustrates a representative portion of a vane ring assembly from the turbine section 28 of the engine 20. The vane ring assembly is made up of a plurality of vane arc segments 60 that are situated in a circumferential row about the engine central axis A. FIGS. 3A and 3B illustrate isolated views from different angles of a representative one of the vane arc segments 60. Although the vane arc segments 60 are shown and described with reference to application in the turbine section 28, it is to be understood that the examples herein are also applicable to structural vanes in other sections of the engine 20.

The vane arc segment 60 is comprised of an airfoil piece 62. The airfoil piece 62 includes several sections, including first and second platforms 63/64 and an airfoil section 66 that extends between the first and second platforms 63/64. The airfoil section 66 defines a leading end 66a, a trailing end 66b, and pressure and suction sides 66c/66d.

In this example, the first platform 63 is a radially outer platform and the second platform 64 is a radially inner platform. The first platform 63 defines axially-sloped suction and pressure side circumferential mate faces 63a/63b, first and second axial sides 63c/63d, a gaspath side 63e, and a non-gaspath side 63f. Likewise, the second platform 64 defines axially-sloped suction and pressure side circumferential mate faces 64a/64b, first and second axial sides 64c/64d, a gaspath side 64e, and a non-gaspath side 64f. The first axial sides 63c/64c are axially forward sides, and the second axial sides 63d/64d are axially trailing sides.

The mate faces 63a/63b/64a/64b are sloped with respect to the central engine axis A. As an example, the mate faces 63a/63b/64a/64b form angles, represented at 72, with the axis A, and the angles are at least 45°. In some examples, where the mate faces 63a/63b/64a/64b are straight, it is the planes of the mate faces 63a/63b/64a/64b that form the angle 72. In other examples, where the mate faces 63a/63b/

64a/64b are curvilinear, the angle 72 may be represented using the line between the forward and trailing corners of the mate face 63a/63b/64a/64b.

The first platform 63 further includes a flange 68 that projects (radially) from the non-gaspath side 63f. The flange 68 is generally elongated and runs along at least a portion of the extent of the circumferential mate face 63a of the first platform 63. In the illustrated example, the flange 68 is co-extensive with the mate face 63a, although in modified examples the flange 68 may be somewhat shorter than the mate face 63a. Most typically, the flange 68 runs along at least 50%, at least 60%, or at least 70% of the extent of the mate face 63a.

The flange 68 defines a radial face 68a, an outer side face 68b, an inner side face 68c, a forward face 68d, and a trailing face 68e. Although the position of the flange 68 could vary somewhat, in the illustrated example the outer side face 68b is flush with the mate face 63a, and the trailing face 68e is flush with the axial side 63d.

Figure 2B:
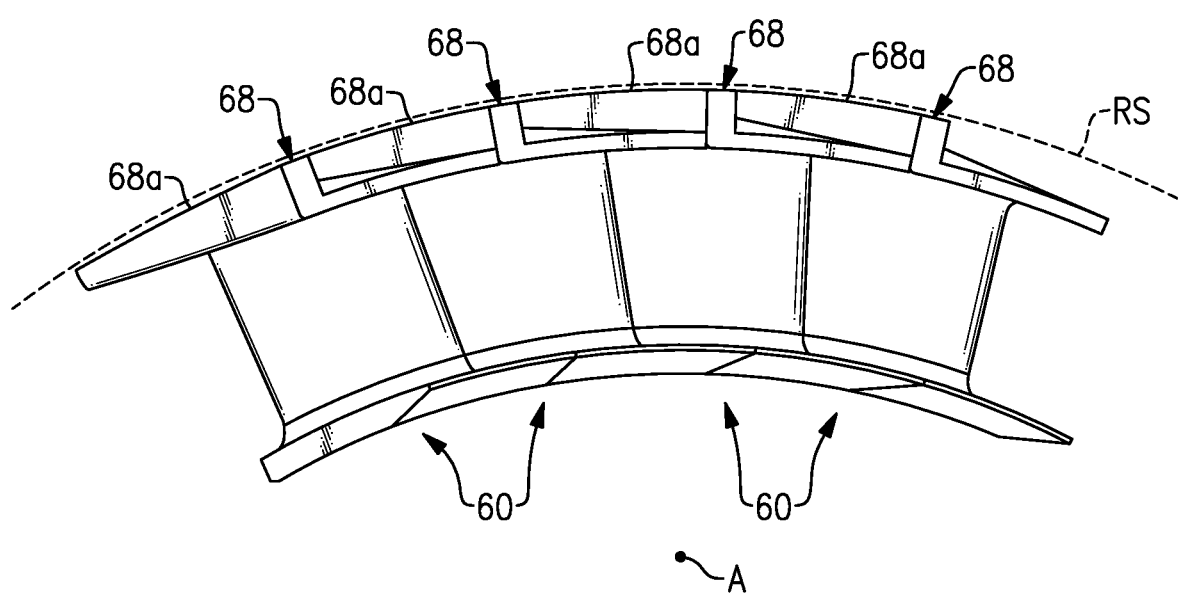
FIG. 2B illustrates an axial view of the vane ring assembly of FIG. 2A.

The radial face 68a may have planar profile or a curved profile. In the illustrated example, the radial face 68a has a curved profile, represented at 68f. As will be described further below, the profile 68f may be used to facilitate load transmission. In the illustrated example, the curved profile 68f is that of a cylindrical surface segment. A cylindrical surface segment is a surface, here the radial face 68a, that has the shape of a section of a surface of a cylinder. For example, as shown in FIG. 2B, which is an axial view looking forward, the cylindrical surface segment of the profile 68f is that of a reference cylinder (RS) that has its main axis parallel to the central engine axis A. For instance, the main axis of the reference cylinder is co-linear with the central engine axis A.

The airfoil piece 62 is continuous in that the platforms 63/64 and airfoil section 66 constitute a single, uninterrupted body. As an example, the airfoil piece may be formed of a ceramic material, such as a ceramic matrix composite. In the illustrated example, referring to cutaway section B in FIG. 3A, the airfoil piece 62 is formed of a ceramic matrix composite in which ceramic fibers 70a are disposed in a ceramic matrix 70b. The ceramic matrix composite may be, but is not limited to, a SiC/SiC ceramic matrix composite in which SiC fibers are disposed within a SiC matrix. The ceramic fibers 70a may be provided in fiber plies, represented at 70c. The plies 70c may be woven or unidirectional and may collectively include plies of different fiber weave configurations. The fiber plies 70c may be continuous through the first platform 63, including the flange 68, the airfoil section 66, and the second platform 64. In one example, the fiber plies 70c are laid-up in a laminate configuration. The use of the flange 68 is primarily directed to ceramic airfoil pieces 62, however, it is to be appreciated that this disclosure may also be applicable to certain stress-limited metallic alloys, such as refractory metallic alloys (e.g., molybdenum-based alloys) or other alloys that have high temperature resistance but low strength.

In general, support schemes for mounting structural vane segments formed of ceramic matrix composites or stress-limited metallic alloys are challenging due to lower material stress limits in comparison to high strength superalloys used for some traditional vane segments. For instance, traditional support schemes that utilize hooks or a series of rails can concentrate stresses, create aerodynamic loads, and/or create thermal stresses which may exceed material limits of ceramic matrix composites or stress-limited metallic alloys. Moreover, traditional hooks and rails often have complex geometries that are challenging to manufacture from ceramic matrix composites. Therefore, even though ceramic matrix composites or stress-limited metallic alloys may have many potential benefits, such benefits cannot be realized without a suitable support scheme. In this regard, as will be discussed, the vane arc segment 60 is designed to facilitate a low-stress mounting scheme.

The vane arc segment 60 may be mounted in the engine 20 between inner and outer support structures. The support structures are not particularly limited and may be cases, intermediate carriers, or the like, and are typically formed of metallic alloys that can bear the loads received. During operation of the engine 20 combustion gases flow across the airfoil section 66 and gaspath sides 63e/64e of the platforms 63/64. The flow causes aerodynamic loads on the vane arc segment 60. The aerodynamic loads are transmitted through the vane arc segment 60 to the support structure. In this regard, the flange 68 serves as the primary load-bearing feature to transmit such loads.

Figure 4:
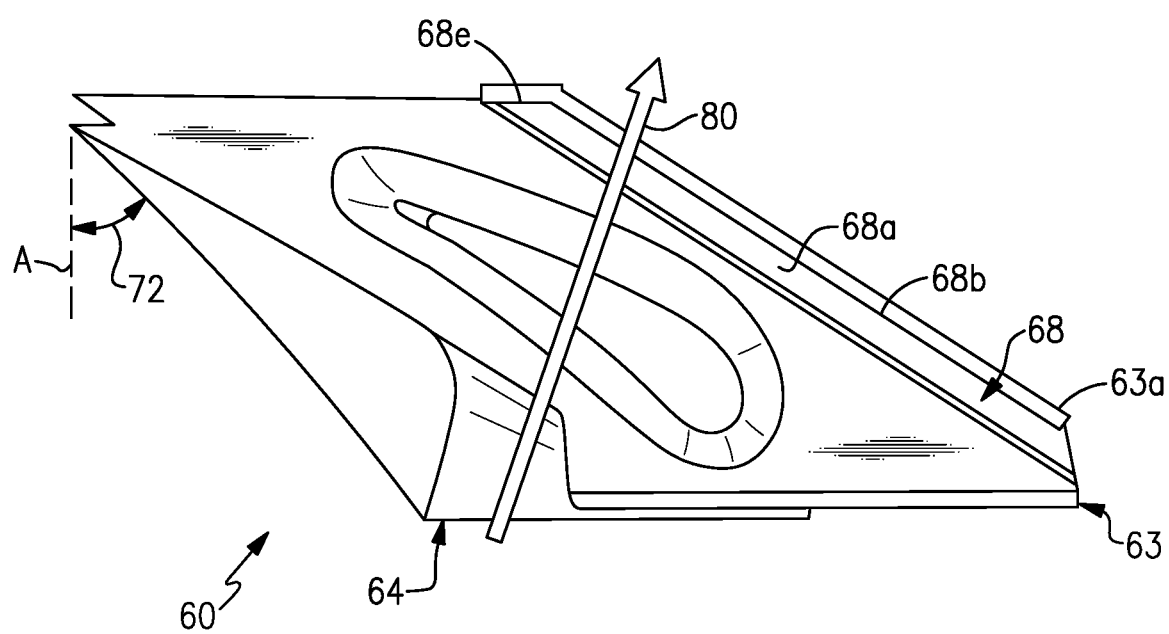
FIG. 4 illustrates a total aerodynamic load vector on the vane arc segment.

The aerodynamic loads may be summed as a bulk, or total, aerodynamic load vector. For instance, the aerodynamic load vector may be optimized or design for a maximum pressure condition and may be understood as the force applied at the center of pressure on the vane arc segment 60. As shown in FIG. 4, the total aerodynamic load vector is represented at 80. In this case, the total aerodynamic load vector 80 intersects the flange 68 and, in this example, is orthogonal within +/−15° to the length direction of the flange 68. The orthogonal relationship between the total aerodynamic load vector 80 and the direction of the flange 68 facilitates establishing an efficient load path for transmission of the loads from the vane arc segment 60, which minimizes pressure-driven stresses on the arc vane segment 60 without imparting a twist between the airfoil section 66 and the first platform 63. By comparison, a less efficient load path would have twist and, therefore, a longer, less direct load path.

The orthogonal orientation of the flange 68 is governed by the desired orientation relative to the total aerodynamic load vector 80. The slope angles of the circumferential mate faces 63a/63b/64a/64b of the platforms 63/64 are then designed to the orientation of the flange 68. Here, with the orthogonal orientation of the flange 68, the slope of the circumferential mate face 63a is highly angled at slope angle of 45° or more.

The flange 68 transmits tangential, axial, and radial loads. For example, at least the faces 68a, 68b, and 68e of the flange 68 are in contact with a corresponding portion of the support structure to transmit loads to. Tangential and axial loads are transmitted through the outer side face 68b and axial face 68e, as well as the axial side 63d of the platform 63. The radial loads are transmitted through the radial face 68a. For example, all radial loads from the total aerodynamic load vector 80 that are transmitted through the radially outer diameter of the vane arc segment 60 are transmitted through the radial face 68a (radial loads may also be transmitted through the radially inner diameter at the second platform 64). In this regard, the afore-mentioned curved profile 68f of the radial face 68a may be used to facilitate a more uniform load transfer. For instance, the radial face 68a may mate with a complimentary face on the support structure. The total aerodynamic load vector 80 may cause the vane arc segment 60 to tilt slightly in the direction of the total aerodynamic load vector 80. The profile 68f enables the radial face 68a to be at a single radius and thereby serve as a true radial face to uniformly transmit radial loads, to the complimentary face on the support structure.

The flange 68 also has a geometry that can be readily manufactured from CMC or from stress-limited alloys. For instance, the flange 68 is generally straight and does not contain hooks or high-radius turns. For CMCs, the flange 68 is also of relatively low-profile and may therefore also facilitate lowering thermal gradients. For instance, the lack of hooks and high-radius enables the flange 68 to be formed from a layered CMC composite by simply bending the layers of the CMC of the platform radially outwards, which also enables the platform to be thinner than it otherwise would need to be if more complex, larger reaction features were used. The thinness may facilitate reducing thermal gradients because there is less insulating CMC material. As a result, without the disclosed geometry of the flange 68, thicker features would be required to react out the aerodynamic loads and there would be higher thermal gradients due to the thickness. Additionally, without hooks or the like, the mounting of the vane arc segment 60 is relatively simple.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
a continuous airfoil piece for arrangement in a gas turbine engine about a central engine axis, the continuous airfoil piece defining first and second platforms and an airfoil section extending between the first and second platforms,
the airfoil section having a pressure side and a suction side,
the first platform defining axially-sloped suction and pressure side circumferential mate faces, first and second axial sides, a gaspath side, a non-gaspath side, and a flange projecting from the non-gaspath side, the axially-sloped suction and pressure side circumferential mate faces lying in planes, the planes forming an angle of at least 45° relative to the central engine axis,
the flange extending along at least a portion of the axially-sloped suction side circumferential mate face, and the flange being flush with the axially-sloped suction side circumferential mate face.

2. The vane arc segment as recited in claim 1, wherein the airfoil piece is formed of a ceramic matrix composite.

3. The vane arc segment as recited in claim 2, wherein the ceramic matrix composite has a plurality of fiber plies that are continuous through the flange and first platform, the airfoil section, and the second platform.

4. The vane arc segment as recited in claim 3, wherein the flange bears radial, tangential, and axial aerodynamic load transmissions of the airfoil piece.

5. The vane arc segment as recited in claim 1, wherein the flange is coextensive with the axially-sloped suction side circumferential mate face.

6. The vane arc segment as recited in claim 1, wherein the flange includes a radial face that has a curved profile.

7. The vane arc segment as recited in claim 6, wherein the curved profile is a cylindrical surface segment.

8. The vane arc segment as recited in claim 1, wherein the flange is a sole flange on the non-gaspath side.

9. The vane arc segment as recited in claim 1, wherein the flange is a sole flange on the non-gaspath side that bears radial, tangential, and axial aerodynamic load transmissions of the airfoil piece.

10. The vane arc segment as recited in claim 9, wherein the flange is elongated in a length direction along the axially-sloped suction side circumferential mate face, and the length direction is substantially perpendicular to a total aerodynamic load vector of the airfoil piece.

11. The vane arc segment as recited in claim 10, wherein the airfoil piece is formed of a ceramic matrix composite.

12. A vane arc segment comprising:
a continuous airfoil piece for arrangement in a gas turbine engine about a central engine axis, the continuous airfoil piece defining first and second platforms and an airfoil section extending between the first and second platforms,
the airfoil section having a pressure side and a suction side,
the first platform defining axially-sloped suction and pressure side circumferential mate faces, first and second axial sides, a gaspath side, a non-gaspath side, and a flange projecting from the non-gaspath side,
the flange having faces that bear radial, tangential, and axial aerodynamic load transmissions of the airfoil piece, wherein one of the faces of the flange is a radial face, and the radial face has a curved profile that is a cylindrical surface segment of a reference cylinder having a main axis that is co-linear with the central engine axis.

13. The vane arc segment as recited in claim 12, wherein the flange is elongated along a flange axis, and the flange axis is substantially perpendicular to a total aerodynamic load vector of the airfoil piece.

14. The vane arc segment as recited in claim 12, wherein the airfoil piece is formed of a ceramic matrix composite that has a plurality of fiber plies that are continuous through the flange and first platform, the airfoil section, and the second platform.

15. The vane arc segment as recited in claim 12, wherein the axially-sloped suction and pressure side circumferential mate faces form an angle of at least 45° relative to an axial direction of the vane arc segment.

16. The vane arc segment as recited in claim 12, wherein the flange is coextensive with the axially-sloped suction side circumferential mate face, and the flange is flush with the axially-sloped suction side circumferential mate face.

17. A vane arc segment comprising:
an airfoil piece defining first and second platforms and an airfoil section extending between the first and second platforms,
the airfoil section having a pressure side and a suction side,
the first platform defining suction and pressure side circumferential mate faces, first and second axial sides, a gaspath side, a non-gaspath side, and a flange projecting from the non-gaspath side, the flange being a sole flange on the non-gaspath side, the flange having one or more faces that bear aerodynamic load transmissions of the airfoil piece, the flange being elongated along a flange axis, and the flange axis being substantially perpendicular to a total aerodynamic load vector of the airfoil piece, and the airfoil piece being formed of a ceramic matrix composite having a plurality of fiber plies that are continuous through the flange and first platform, the airfoil section, and the second platform.

18. The vane arc segment as recited in claim 17, wherein the ceramic matrix composite contains a SiC matrix and SiC fibers.

19. The vane arc segment as recited in claim 18, wherein one of the faces of the flange is a radial face, the radial face has a curved profile, and the curved profile is a cylindrical surface segment.

20. The vane arc segment as recited in claim 19, wherein the suction and pressure side circumferential mate faces are axially-sloped and form an angle of at least 45° relative to an axial direction of the vane arc segment, the flange is coextensive with the suction side circumferential mate face, and the flange is flush with the axially-sloped suction side circumferential mate face.

\* \* \* \* \*